(12) United States Patent
Gerrese

(10) Patent No.: US 12,555,049 B2
(45) Date of Patent: Feb. 17, 2026

(54) RIDE REQUEST MAP DISPLAYING UNDISCOVERED AREAS

(71) Applicant: GM Cruise Holdings LLC, San Francisco, CA (US)

(72) Inventor: Alexander Willem Gerrese, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 272 days.

(21) Appl. No.: 18/328,124

(22) Filed: Jun. 2, 2023

(65) Prior Publication Data

US 2024/0403748 A1 Dec. 5, 2024

(51) Int. Cl.
*G06Q 10/06* (2023.01)
*G06Q 10/0631* (2023.01)

(52) U.S. Cl.
CPC .............................. *G06Q 10/06311* (2013.01)

(58) Field of Classification Search
CPC .......................................... G06Q 10/00–90/00
See application file for complete search history.

(56) References Cited

U.S. PATENT DOCUMENTS

| | | | |
|---|---|---|---|
| 11,460,314 B1* | 10/2022 | Ziniti | G05D 1/0212 |
| 2013/0304366 A1* | 11/2013 | Jung | H04L 67/535 |
| | | | 709/224 |
| 2018/0144369 A1* | 5/2018 | Pouliot | B60W 30/0956 |
| 2019/0311417 A1* | 10/2019 | Randisi | H04W 4/48 |
| 2021/0174270 A1* | 6/2021 | Irimoto | G08G 1/202 |

\* cited by examiner

*Primary Examiner* — Arif Ullah
(74) *Attorney, Agent, or Firm* — Honigman LLP; Matthew H. Szalach; Jonathan P. O'Brien

(57) ABSTRACT

Systems and methods for providing an individualized map highlighting undiscovered areas of a locale. In particular, systems and methods are provided for providing a map that visually differentiates areas a user has visited from areas a user has yet to explore. In some implementations, generalized maps are displayed with highlighted and lowlighted areas representing unexplored and explored areas of the map. A generalized map can show popular tourist destinations or other features of each area. In some examples, specific map details of a particular area are revealed when a user selects the particular map area. In some examples, unexplored areas are revealed when a user elects to visit the unexplored area.

18 Claims, 9 Drawing Sheets

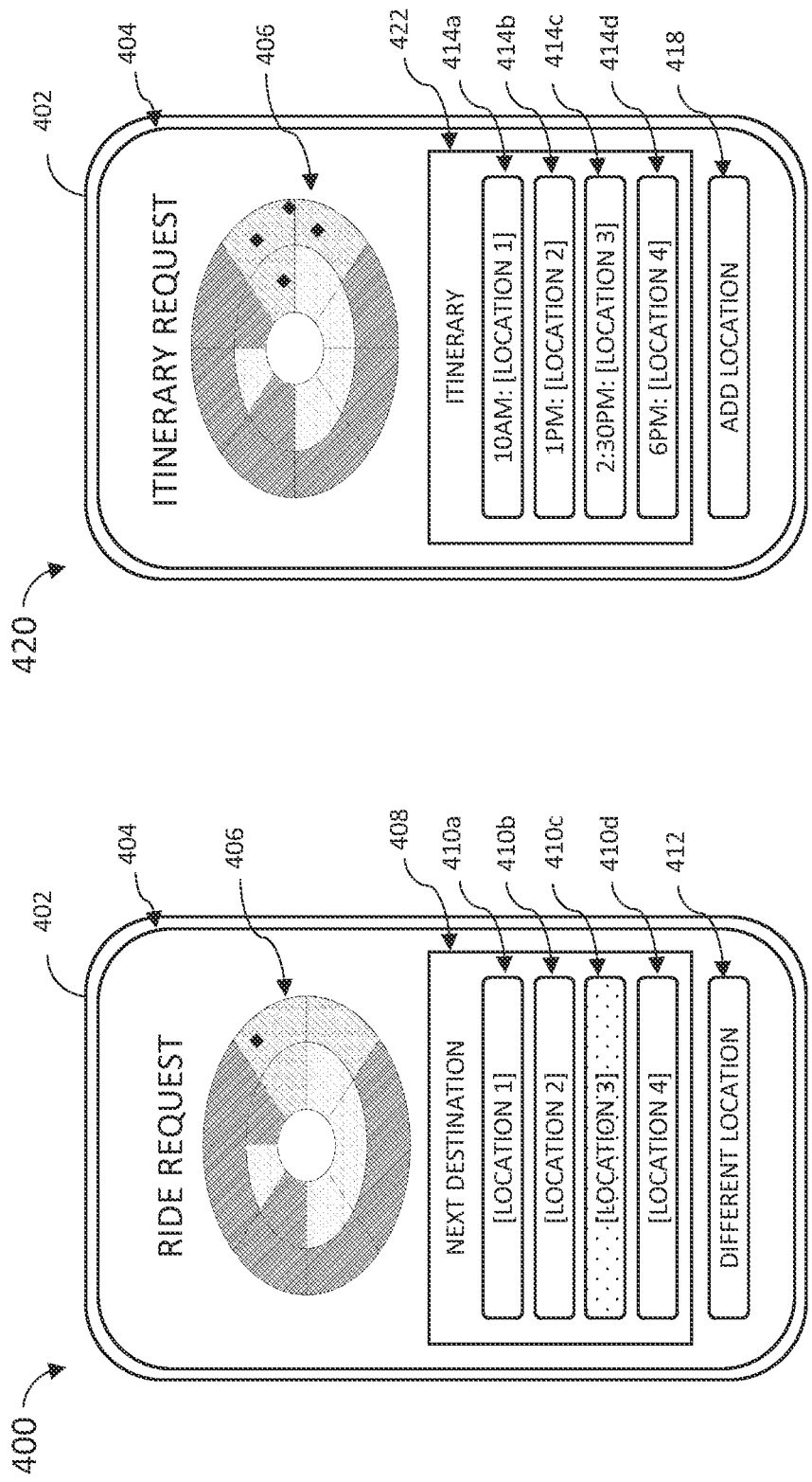

RIDE REQUEST MAP DISPLAYING UNDISCOVERED AREAS

BACKGROUND

1. Technical Field

The present disclosure generally relates to vehicle sensors and, more specifically, using vehicle sensors to observe surrounding fleet vehicles while parked.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIGS. 4A and 4B show examples of an interface for a ridehail service showing a map indicating undiscovered areas, according to some examples of the disclosure;

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for providing an individualized map highlighting undiscovered areas of a locale. In particular, systems and methods are provided for providing a map that visually differentiates areas a user has visited from areas a user has yet to explore. In some implementations, generalized maps are displayed with highlighted and lowlighted areas representing unexplored and explored areas of the map. A generalized map can show popular tourist destinations or other features of each area. In some examples, specific map details of a particular area are revealed when a user selects the particular map area. In some examples, unexplored areas are revealed when a user elects to visit the unexplored area.

Traditionally, when a tourist visits a new area, the tourist performs research to determine what places or destinations to see in the new area. In some examples, a person visiting a new city can have a vast number of potential tourist destinations to visit, each of which can be in a distinct part of the city. The person can suffer decision fatigue from trying to decide which place to visit next. A map displaying destinations that are close by as well as highlighting various areas that the person has yet to explore can provide guidance and visually offer suggestions of next places to visit. For example, popular tourist destinations can be displayed as suggested destinations on the map. In some examples, a user's ride history can be used to predict the user's destination preferences, and destinations can be suggested based on the predicted user destination preferences.

Example Autonomous Vehicle for Providing Fleet Vehicle Rides

Figure 1:
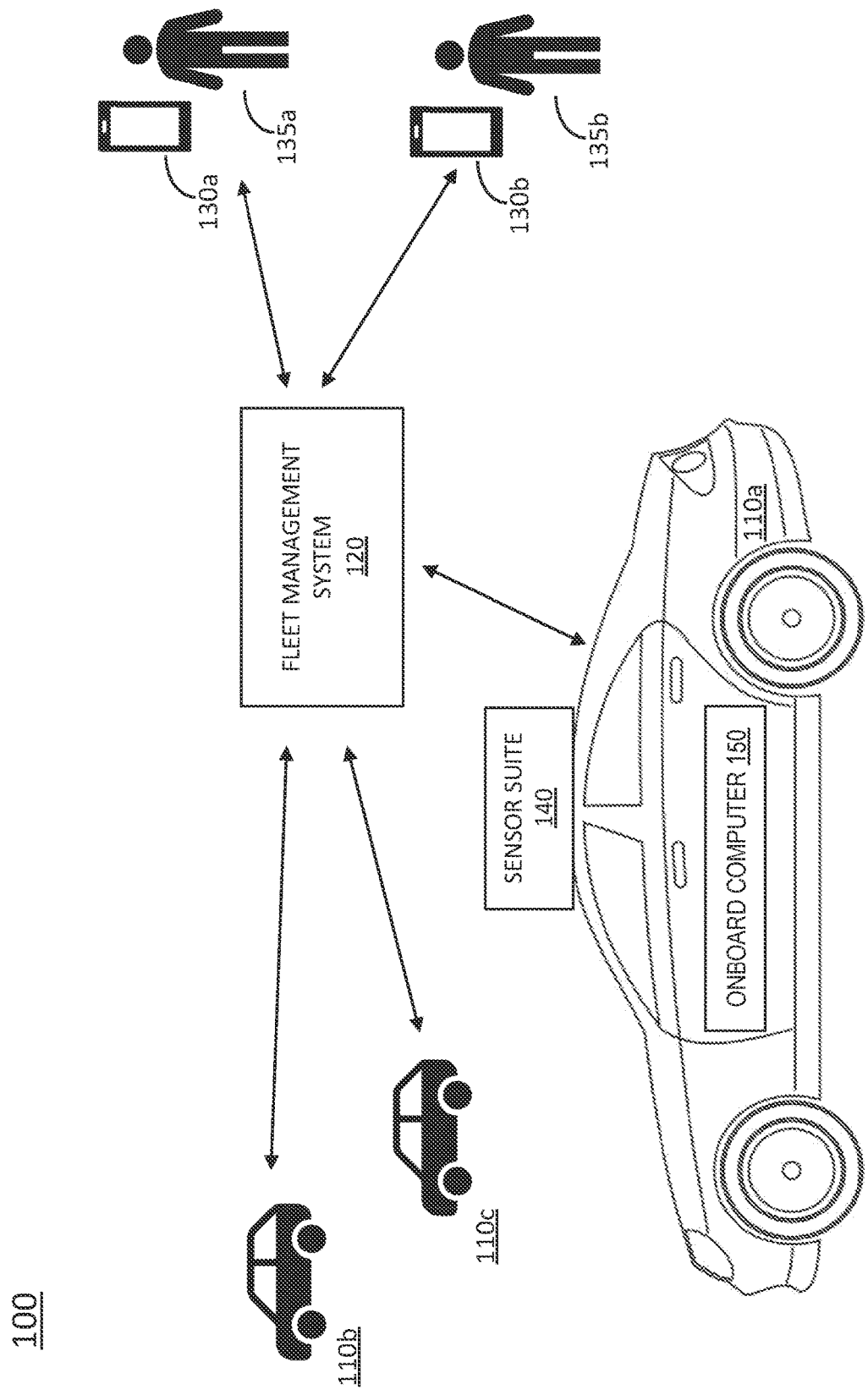
FIG. 1 illustrates an autonomous vehicle for providing fleet vehicle rides, according to some examples of the present disclosure.

FIG. 1 illustrates a system 100 including a fleet of AVs that can provide services to users, according to some embodiments of the present disclosure. The system 100 includes AVs 110a, 110b, 110c (collectively referred to as "AVs 110" or "AV 110"), a fleet management system 120, and client devices 130a and 130b (collectively referred to as "client devices 130" or "client device 130"). The client devices 130a and 130b are associated with users 135a and 135b, respectively. The AV 110a includes a sensor suite 140 and an onboard computer 150. Even though not shown in FIG. 1, the AV 110b or 110b can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 may provide the AVs 110 information for navigating the AVs 110 during the operations of the AVs. For instance, the fleet management system 120 may provide maps (e.g., semantic maps, vector maps, etc.) of environments where AVs operate. The fleet management system 120 can also record the pick-up and drop-off locations of users 135 and maintain a ride history and/or a location history for each user 135 in a user database and/or a map database.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135.

The client device 130 may provide the user 135 an UI through which the user 135 can interact with the AV 110 that provides a ride to the user 135. The AV 110 may transmit one or more messages to the UI. The messages may be associated with one or more behaviors performed by the AV 110 for providing the ride to the user 135. The user 135 may view the messages in the UI. The UI may also allow the user 135 to interact with the messages. In some embodiments, the UI allows the user 135 to provide a comment or rate on the AV behaviors or the ride. The UI may also allow the user 135 to modify one or more settings of the ride in light of the AV behaviors.

The client device 130 may also provide the user 135 an UI through which the user 135 can interact with the fleet management system 120. For instance, the UI enables the user to submit a request for assistance to the fleet management system 120 through a network or a telephone service (e.g., a customer service hotline). The UI can further facilitate a communication between the user 135 and an agent of the fleet management system 120 who can provide the requested assistance. The UI may further enable the user to comment on or rate the agent.

The AV 110 is preferably a fully autonomous automobile, but may additionally or alternatively be any semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 6.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the ride evaluation platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on.

Method for a Map Displaying Undiscovered Areas

Figure 2:
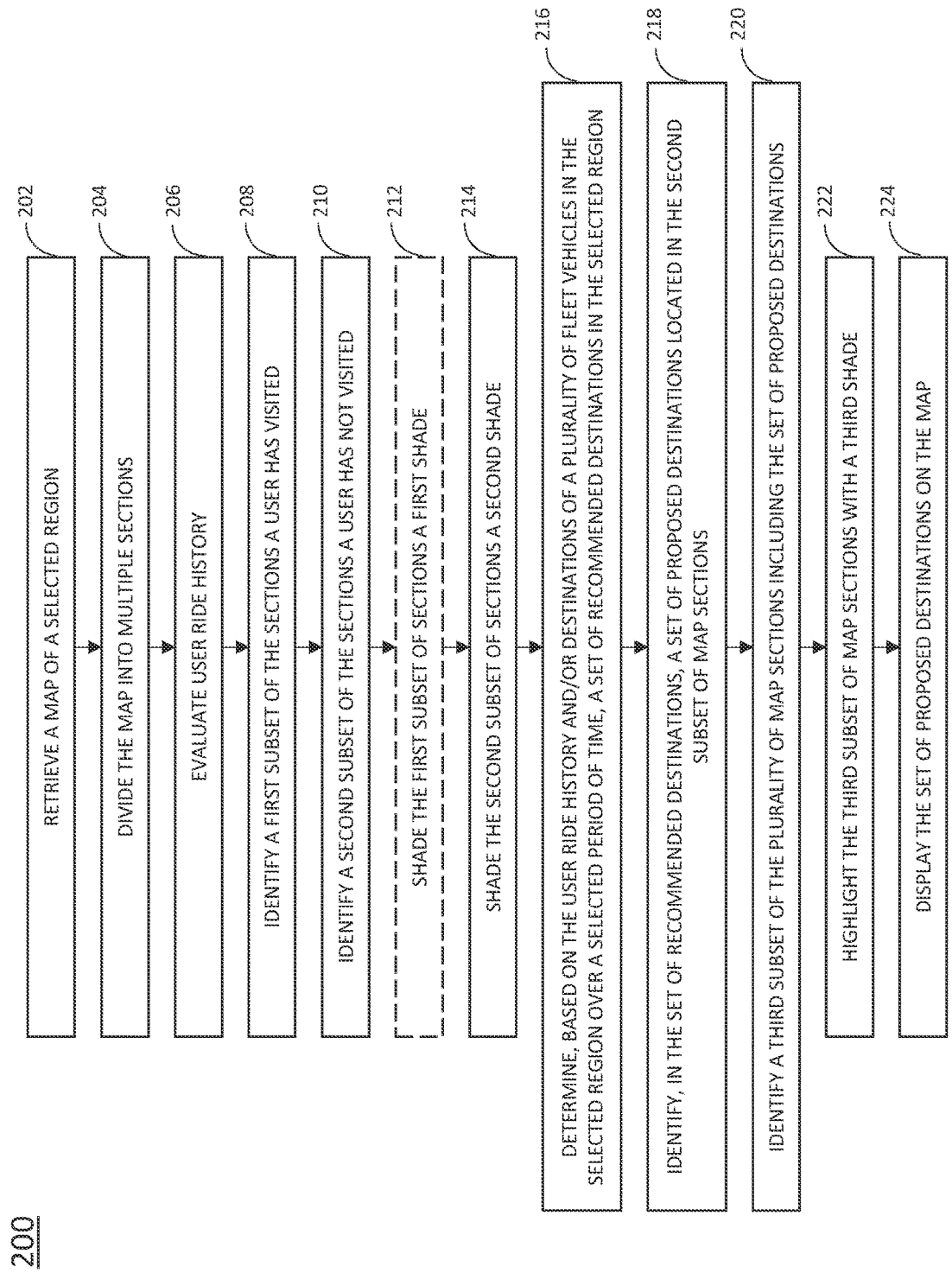
FIG. 2 is a flow chart illustrating a method 200 for providing a map displaying undiscovered areas of a region, according to some examples of the present disclosure.

FIG. 2 is a flow chart illustrating a method 200 for providing a map displaying undiscovered areas of a region, according to various examples of the present disclosure. The method 200 can be particularly useful for displaying a map to a tourist visiting a different city, who may want to be sure and visit various neighborhoods of the city. In some examples, the method 200 can be used to display a map of a city with areas a user has not yet visited shaded, clouded, blurred, or otherwise obscured, while areas the user has visited are displayed clearly, highlighted, and/or shaded with a different and less-obscuring shade. Thus, the map highlights to a viewer which areas of a region the user has yet to explore and which areas the user has already visited. In some examples, specific destinations within the region are identified and recommended to the user, where the specific destinations can be tourist destinations, or other destinations a user may be likely to be interested in visiting. The specific destinations can be shown on the map, or listed along with the map and configured to be shown on the map when selected or scrolled over.

The method 200 begins at step 202, and a map of a selected region is retrieved. The selected region can be based on a user's current location, or it can be specified by the user. In some examples, the selected region is a metropolitan area, a city, a town, or a village, and in some examples, the selected region is a county, state, or other defined region.

At step 204, the selected region shown in the map is divided into multiple sections. In some examples, a region has predefined sections, and the map can be divided into the predefined sections. For example, New York City has a number of predefined neighborhoods such as Midtown, Chinatown, the Leather District, and the Upper West Side, and a map of New York City can be divided into sections such that each section represents one of the predefined neighborhoods. Similarly, in another example, Paris has a number of predefined sections called "arrondissements", and the map can be divided into sections such that each arrondissement is one section. Thus, in various examples, the sections can be different neighborhoods of the region. In some examples, various sections of a region can have distinct offerings and different qualities or vibes, and a user may want to be sure and visit certain sections of the region when visiting the region. Additionally, in some examples, the sections can be individual blocks, individual blocks, and/or individual lanes.

At step 206, user ride history is evaluated to determine which sections of the region a user has previously visited. In some examples, the user ride history shows the sections the user has visited using a ridehail vehicle from a particular ridehail service or vehicle fleet. In some examples, such as when a user has provided location services, other user location history can be evaluated to determine other sections the user has visited. In some examples, user location history can be retrieved from one or more other mapping applications. The user ride history can also be used to determine the type of destinations a user frequents and/or prefers. This can include the types of destinations a user frequents and/or prefers in the user's default region, as well as the types of destinations a user frequents and/or prefers when the user travels to other regions. In various examples, the user's default region can be the user's hometown, the region the user most frequently travels to, and/or a preferred region of the user. In one example, a user's default region is the region in which the user most frequently uses the ridehail service. In some examples, a user can select the user's default region in a user's ridehail account. In other examples, a ridehail service determines a user's default region based on user ride requests and user ride history, where the user's default region is the region in which the user most frequently requests rides.

At step 208, a first subset of the sections is identified, where the first subset includes the sections of the region that a user has visited. In one example, if a user is visiting a region for the first time, the section the user is currently in is the only section identified. In another example, if a user has been in the region for a few days already and visited multiple sections, the various sections the user has already visited are identified. Similarly, if the user has visited the region previously, the sections the user visited in previous visits are identified. In some examples, a user account includes pre-stored maps indicating regions the user has visited. The pre-stored maps can be associated with a user account and can be updated as the user travels and visits new areas.

At step 210, a second subset of the sections is identified, where the second subset includes the sections of the region that a user has not visited. In one example, if a user is visiting a region for the first time, the sections other than the section the user is currently in can be identified as part of the second subset. In another example, if a user has been in the region for a few days already and visited multiple sections, the various sections the user has not yet visited are identified. Similarly, if the user has visited the region previously, any sections the user did not visit in previous visits are identified.

At step 212, optionally, the first subset of sections are shaded a first shade. At step 214, the second subset of sections is shaded a second shade. In various examples, the first and second shades distinguish the first and second subsets of sections. In some examples, the first subset of sections remains unshaded (or, the first shade is a clear shade), such that the sections of the region the user has already visited are clearly displayed on the map, and the second subset of sections is grayed, blurred, or clouded, such that the sections of the region the user has not yet visited are fogged out and not clearly displayed on the map. Thus, the first and second subsets of sections are visibly distinguished from one another on the map, and the user can easily see which sections of the region the user has visited versus which sections the user has not yet visited. In some examples, the first and second shades can include colors. In some examples, the first and second shades can include patterns. The first and second shades can have any selected degree of transparency and/or any selected degree of opacity.

At step 216, a set of recommended destinations in the selected region are identified. In particular, based on the ride history of the user, a set of recommended destinations can be determined. For example, if the user tends to visit galleries regularly (either in their default or preferred region, or when visiting new regions), the set of recommended destinations can include galleries. Similarly, if the user tends to visit trendy cafes (either in their default or preferred region, or when visiting new regions), the set of recommended destinations can include trendy cafes. The set of destinations can also include sightseeing destinations in the region. In some examples, the set of recommended destinations can depend on the time of day and the day of the week, such that brunch places can be displayed on weekend mornings (i.e., during brunch hours), and museums can be displayed during opening hours. In some examples, a user can enter a destination type such as a sightseeing destination, a museum, a dinner destination, an outdoor walking destination, a gallery, a beach, etc., and the set of recommended destinations is limited to include destinations of the selected destination type. In some examples, a user can enter other preferences to filter the set of recommended destinations, such as distance from a current location, cost/price range of the destination, and so on.

The set of recommended destinations can also be based on the destinations of a plurality of fleet vehicles in the region over a selected period of time. In some examples, the set of recommended destinations can be based on the destinations of other visitors to the region over a selected period of time. For instance, recommended destinations can be based on visitor destinations over the previous one, two, three, or four weeks, with destinations frequently visited during the current season being recommended. In one example, recommended destinations can be based on visitor destinations over the past few hours, such that a popular event (e.g., a parade) can be recommended. In some examples, recommended destinations can be based on visitor destinations during the particular time of day, such that popular coffee shops may be recommended in the morning, popular ice cream shops may be recommended in the afternoon, and popular bars may be recommended in the evening.

At step 218, a set of proposed destinations located in the second subset of map sections is identified. In particular, the set of recommended destinations is evaluated and the recommended destinations in the second subset of map sections is identified to generate the set of proposed destinations. Thus, the proposed destinations include recommended destinations in map sections that the user has not yet visited.

At step 220, a third subset of the plurality of map sections is identified, where the third subset includes the set of proposed destinations identified at step 218. Thus, the third subset includes unvisited map sections that have recommended destinations, and the third subset is a subset of the second subset.

At step 222, the third subset of map sections is shaded with a third shade. In various examples, the third shade distinguishes the third subset from the first and second subsets of sections. In some examples, the first, second, and third subsets of sections are visibly distinguished from one another on the map, and the user can easily see which sections of the region the user has visited, which sections the user has not yet visited, and which sections include proposed destinations the method 200 recommends visiting. In some examples, the third shade can include colors. In some examples, the third shade can include patterns. The third shade can have any selected degree of transparency and/or any selected degree of opacity.

At step 224, the set of proposed destinations is displayed on the map. In some examples, proposed destinations appear as points on the map, and when a user scrolls over a destination or clicks on a destination, the destination name and type are displayed. In some examples, a list of the proposed destinations is presented along with the map, and when a user scrolls over or clicks on a list item, the corresponding proposed destination location is highlighted on the map such as by appearing as a star on the map or a corresponding location symbol enlarging on the map.

In various implementations, the method 200 can be tailored according to user preferences. For example, a user can select the first, second, and third shades. In some examples, a user can elect to share user location with a ridehail application, such that locations a user visits while walking or traveling by other means can be accurately reflected in identifying the sections of the region the user has visited and not visited. In some examples, a user can save various destination preferences, such as a preference for independent coffee shops, a preference for vegan eateries (or restaurants/cafes offering vegan options), a preference for selected types of tourist destinations (museums, historical sites, entertainment venues, churches, etc). In some examples, a user can indicate a preference for visiting one or more selected map sections, and destinations in the one or more selected map sections can be proposed.

In some examples, the method 200 can be used to generate an itinerary for a user visiting a selected region. For example, when a user visits a selected region for a first time, the most popular tourist destinations can be included in the itinerary, and when a user visits a selected region a subsequent time, tourist destinations the user has already visited can be excluded and other, as-yet-unvisited, tourist destinations can be included. In some examples, a user can select a period of time for a suggested itinerary, such as a number of hours, a number of days, and/or a time window for each day. In various examples, a suggested itinerary can be updated as a user visits various destinations.

In various implementations, a user's individual maps are saved and associated with the user ridehail account. The user's maps can be retrieved by an autonomous vehicle and/or by the user's ridehail application and/or account when the user uses the ridehail service. As the user travels, the user's maps can be updated. For example, as a user travels in an autonomous vehicle along a route, and traverses into a new map section, the user's map can be updated. The new map section can be a new street, a new street section, a new block, a new neighborhood, etc. In some examples, the autonomous vehicle's sensors (and the autonomous vehicle's determination of its own location) can be used to determine the user location on the user map and update the user map. In some examples, the autonomous vehicle onboard computer can update the user's map. In some examples, a user ridehail service application can update the user's map. The user's map can be displayed on a screen in the vehicle, and the in-vehicle displayed map can be updated during the ride. Similarly, the user's map can be displayed on a user mobile device via a ridehail application, and the ridehail application map can be updated during the ride. The updated user map can be saved and associated with user ridehail account, such that the updated map can be retrieved by an autonomous vehicle and/or by the user's ridehail application when the user next uses the ridehail service. In some examples, the updated user map is saved in a central computer and/or in a cloud service.

Example Map Indicating Undiscovered Areas

Figure 3A:
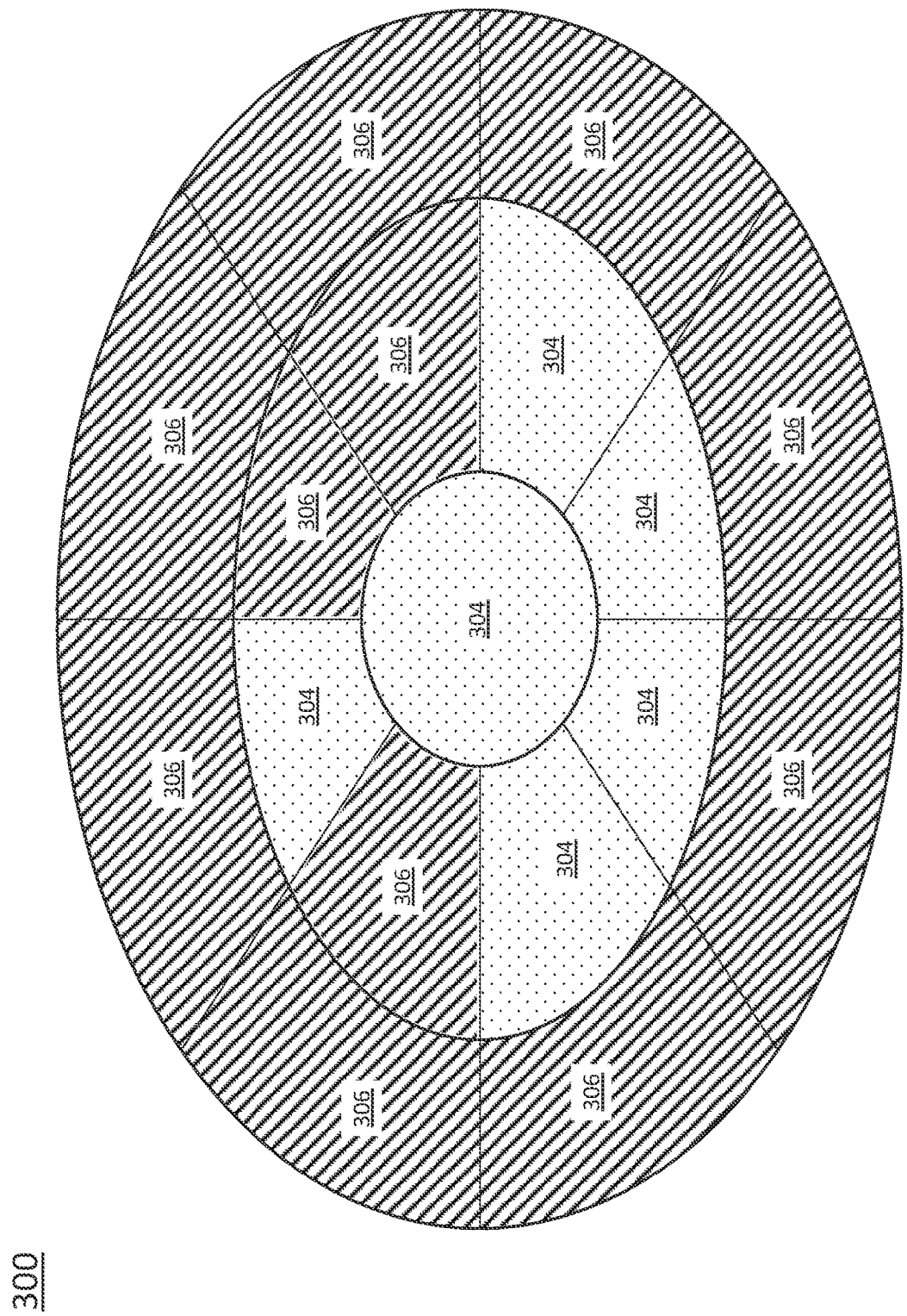
FIGS. 3A-3C illustrate maps of selected regions including multiple map sections according to some examples of the present disclosure.
Figure 3B:
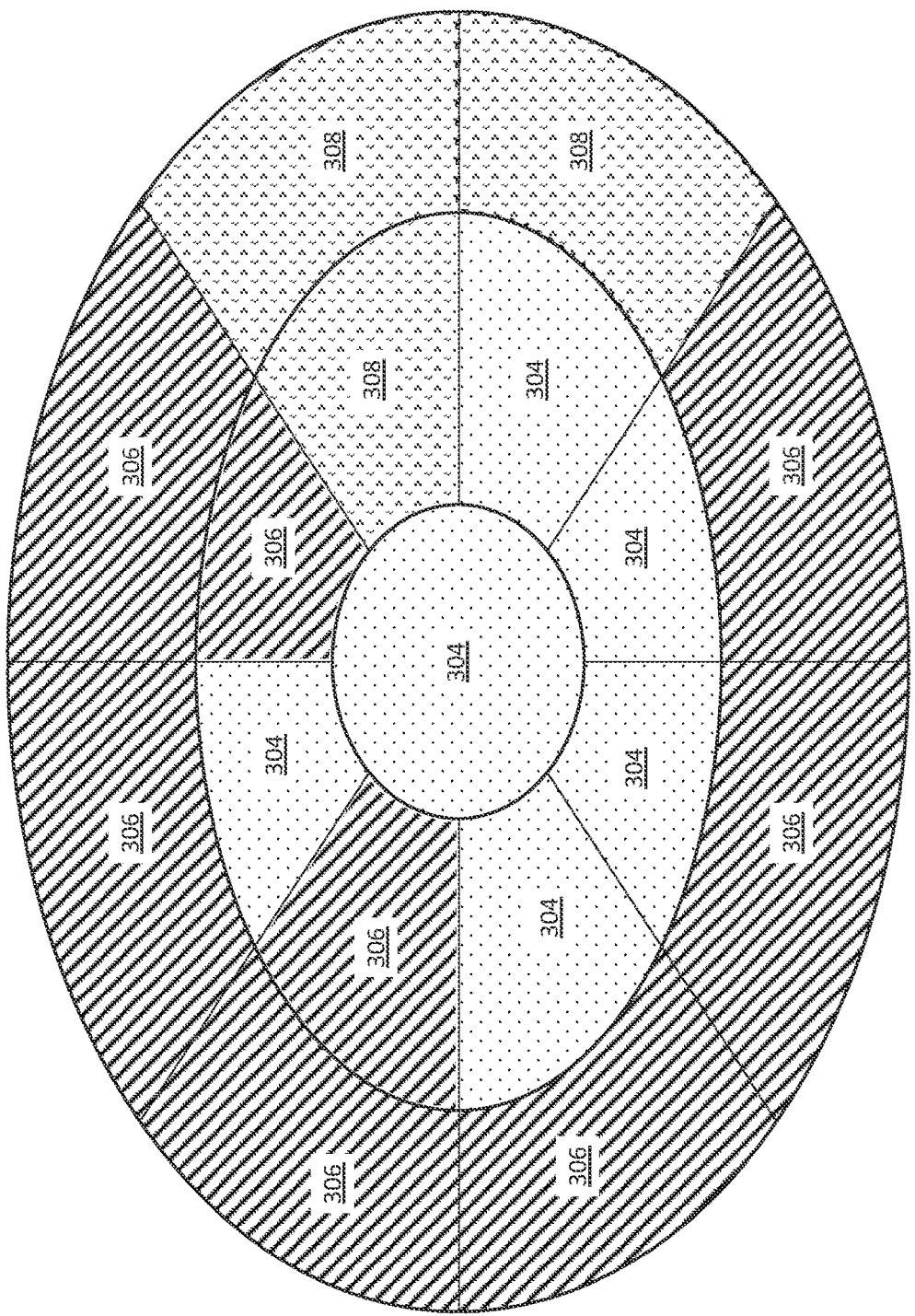
Figure 3C:
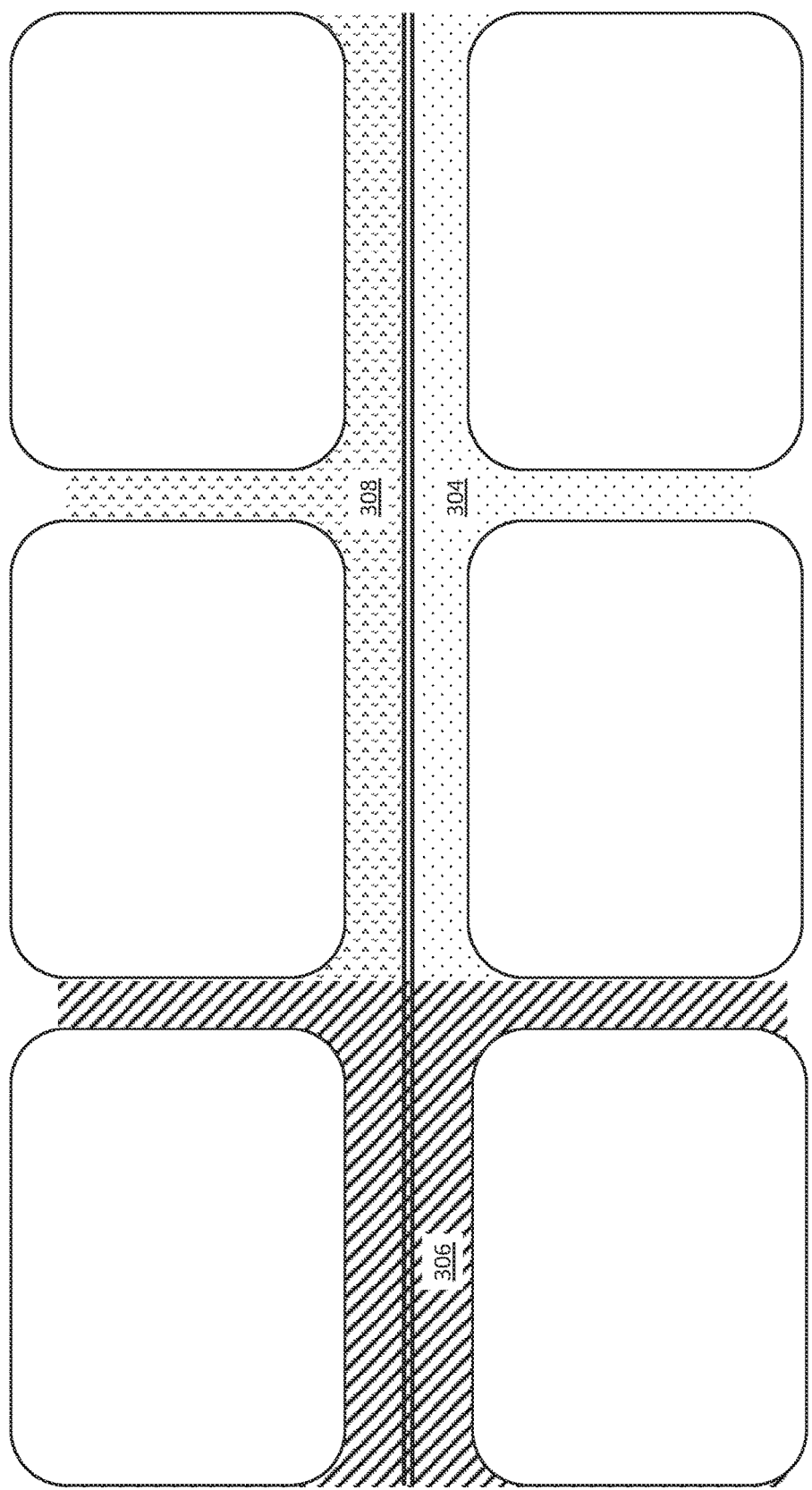

FIGS. 3A-3C illustrate maps of a selected region including multiple map sections, according to various examples of the present disclosure. The map 300 of FIG. 3A shows a map with a first subset 304 of the map sections shaded with a first shade and a second subset 306 of the map sections shaded with a second shade. As described with respect to FIG. 2, the first subset 304 of map sections includes map sections the user has already visited, while the second subset 306 of map sections includes map sections the user has not yet visited. The determination of which map sections the user has visited can be based on user ride history. In some examples, the determination of which map sections the user has visited can be based on other user location data shared with the ridehail service.

The map 320 of FIG. 3B shows the map of FIG. 3A with a first subset 304 of the map sections shaded with a first shade, a second subset 306 of the map sections shaded with a second shade, and a third subset 308 of map sections shaded with a third shade. As described with respect to FIG. 2, the third subset 308 subset of map sections includes a set of recommended destinations located in the unvisited map sections (the second subset 306 of map sections of the map 300 of FIG. 3A). In particular, a set of recommended destinations is evaluated and the recommended destinations in the second subset of map sections is identified to generate a set of proposed destinations located in the third subset 308 of map sections. Thus, the proposed destinations include recommended destinations in map sections that the user has not yet visited. In some examples, the set of proposed destinations can be displayed on the map 320, such as with a circle or other symbol at the destination location. In some examples, proposed destinations appear as points on the map, and when a user scrolls over a point or clicks on a point, the destination name and type are displayed. In some examples, a list of the proposed destinations is presented along with the map, and when a user scrolls over or clicks on a list item, the corresponding proposed destination location is highlighted on the map such as by appearing as a star on the map or a corresponding location symbol enlarging on the map. In some examples, the symbol used to represent a proposed destination can vary based on the destination type, with one symbol representing a sightseeing destination, another symbol representing a museum, another symbol representing a shopping destination, and another symbol representing an eatery (café, restaurant, etc).

The map 340 of FIG. 3C shows another map including several blocks and various streets between the blocks. The map 340 includes a first subset 304 of the map sections shaded with a first shade, a second subset 306 of the map sections shaded with a second shade, and a third subset 308 of map sections shaded with a third shade. As shown in FIG. 3C, the first 304, second 306, and third 308 map sections can be small sections of a map 340. In particular, a section can be a single block, a street, a section of a street, or even a lane of a street. In FIG. 3C, a single street includes each of the three sections 304, 306, 308, with section 304 (indicating map sections visited) including two blocks and a first lane of the street, section 306 including one block and both lanes of the street, and section 308 including two blocks and a second lane of the street. As described with respect to FIG. 2 and FIG. 3B, the third subset 308 subset of map sections includes a set of recommended destinations located in the unvisited map sections.

Example Interface Including a Map Indicating Undiscovered Areas

FIGS. 4A and 4B show examples 400, 420, of an interface for a ridehail service showing a map indicating undiscovered areas, according to some embodiments of the disclosure. FIG. 4A is an example 400 of a device 402 showing a ride request interface 404 for a ridehail application. In particular, the ride request interface 404 on a mobile device shows a ridehail application response to a ride request, including a map 406 highlighting sections the user has visited, sections the user has not yet visited, and sections the user has not yet visited and where proposed destinations (listed in the box 408) are located, as described above with respect to FIGS. 3A-3C. Underneath the map 406, the ride request interface includes a box 408 having a list of first 410a, second 410b, third 410c, and fourth 410d buttons, each labeled with a proposed destination. In some examples, when a user scrolls over or selects one of the first 410a, second 410b, third 410c, or fourth 410d buttons, the corresponding location on the map 406 appears as a black diamond. In particular, in the example 400, the third button 410c is selected and the black diamond on the map 406 indicates the location of the proposed destination corresponding to the third button 410c. In some examples, the text on each of the first 410a, second 410b, third 410c, and fourth 410d buttons is a name and/or description of the location corresponding with the respective button 410a-410d. In some examples, a user can select one of the first 410a, second 410b, third 410c, and fourth 410d buttons as the user's next destination. Alternatively, the user can select the fifth button 412 and request a different location. In some examples, if the user selected the fifth button 412, a list of multiple next destination options appears. The list can look like the list of buttons in the box 408, with a different location associated with each button 410a-410d.

In various examples, one of the first 410a, second 410b, third 410c, and fourth 410d buttons can be selected to submit the ride request from the ridehail application on the mobile device to the ridehail service in the cloud.

FIG. 4B shows an example 420 of a ridehail application interface that may be displayed if the user requests an itinerary for a visit to a region, according to various examples of the present disclosure. In some examples, the ridehail application can generate an itinerary for any selected period of time, and the period of time can include a start time and an end time. As shown in FIG. 4B, the ridehail interface includes a map 406 highlighting sections the user has visited, sections the user has not yet visited, and sections the user has not yet visited and where proposed destinations (listed in the box 422) are located, as described above with respect to FIGS. 3A-3C. Underneath the map 406, the ride request interface includes a box 422 having an itinerary including a list of first 414a, second 414b, third 414c, and fourth 414d buttons, each labeled with a proposed destination and a proposed time. In some examples, each of the locations associated with the first 414a, second 414b, third 414c, and fourth 414d buttons is shown on the map 406. In some examples, when a user scrolls over or selects one of the first 414a, second 414b, third 414c, and fourth 414d buttons, the corresponding diamond indicating the location on the map 406 is enlarged to highlight the corresponding location. In various examples, a user can adjust or delete any item on the itinerary (e.g., a user can adjust the time for a particular item). The user can also add a location to the itinerary using the "Add Location" button 418.

Figure 5:
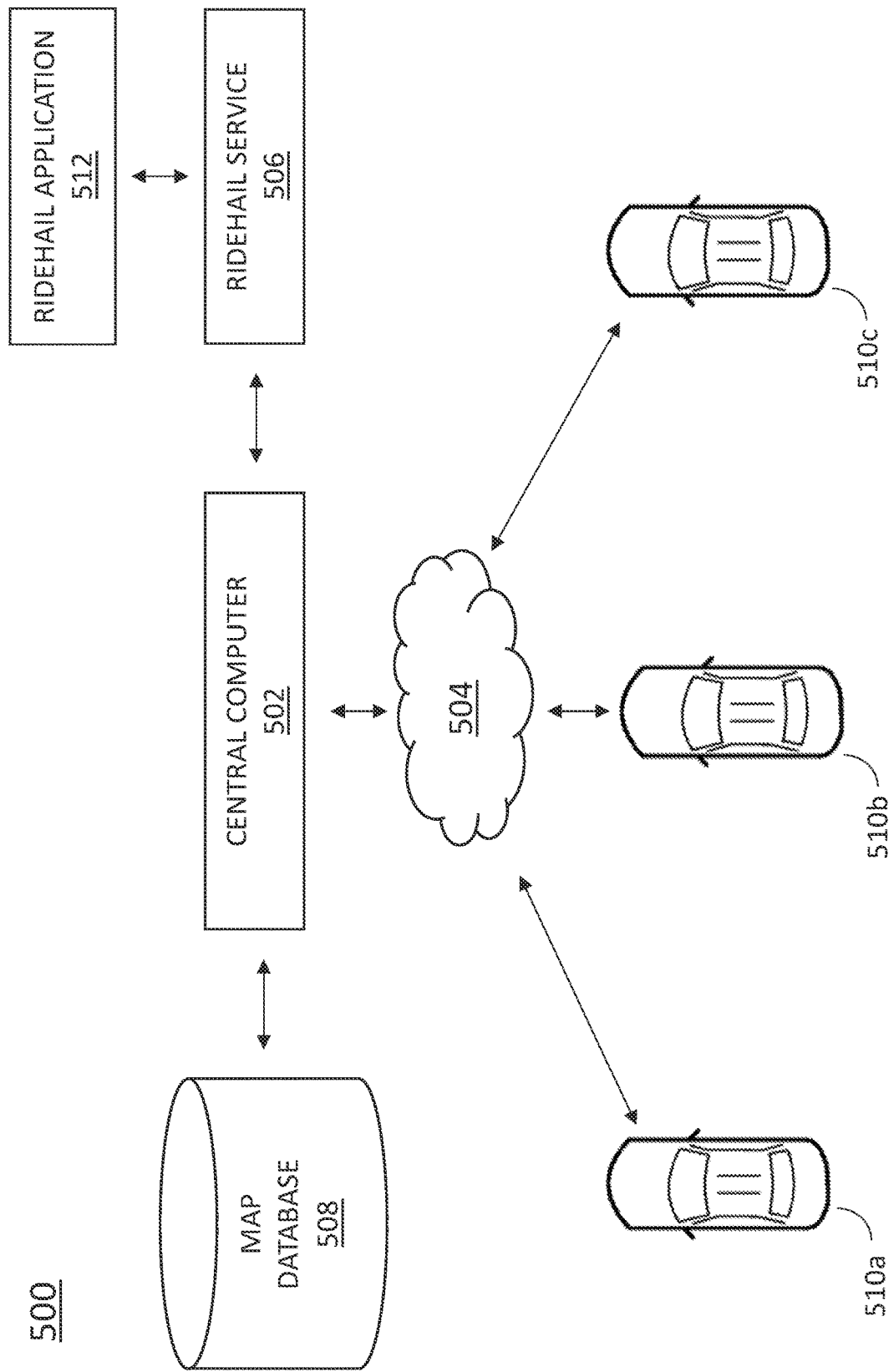
FIG. 5 is a diagram illustrating a fleet of autonomous vehicles in communication with a central computer, according to some embodiments of the disclosure.

Example of an Autonomous Vehicle Fleet System for Providing Undiscovered Map Data FIG. 5 is a diagram 500 illustrating a fleet of autonomous vehicles 510a, 510b, 510c in communication with a central computer 502, according to some embodiments of the disclosure. The vehicles 510a-510c communicate wirelessly with a cloud 504 and a central computer 502. The central computer 502 includes a routing coordinator, a dispatch service, and a database of information from the vehicles 510a-510c in the fleet. In some examples, the database of information can include vehicle conditions and information for each vehicle 510a-510c. Autonomous vehicle fleet routing refers to the routing of multiple vehicles in a fleet. In some implementations, the autonomous vehicles 510a-510c communicate directly with each other. Each received ride request can be assigned, by the central computer 502, to a vehicle 510a-510c in the fleet.

The central computer 502 also acts as a centralized ride management system and communicates with ridehail applications 512 via a ridehail service 506. In various examples, the ridehail service 506 includes a rideshare service (and rideshare users) as well as an autonomous vehicle delivery service. Via the ridehail service 506, the central computer 502 receives ride requests from various user ridehail applications. The central computer 502 also receives location information for the mobile device on which the ridehail application 512 is installed. In some implementations, the ride requests include a pick-up location, a drop-off location, and/or an intermediate stopping location. The central computer 502 can store the location information from each ridehail application 512 in the map database 508. For each ridehail application 512 (or for each user), the map database 508 can store the user's location history over time, based on user ride history data. If a user shares any other location information with the ridehail application 512, the other location information can also be stored in the user's location history in the map database 508.

The data in the map database 508 can be used to generate a map of a region showing areas a user has visited, as discussed above with respect to FIGS. 2, 3A-3C, and 4A-4B. In particular, the central computer 502 can retrieve a user's location history for the selected region, and transmit the location history to the ridehail service 506. In some examples, the central computer 502 generates the map as shown in FIGS. 3A-3C. The map, as well as proposed destinations, is transmitted to the ridehail application 512. In various examples, user location data can be updated when a user rides in a fleet vehicle 510a-510c to another destination. In particular, the destination can be added to the user's location history in the map database 508.

As described above, each vehicle 510a-510c in the fleet of vehicles communicates with a routing coordinator. Thus, information gathered by various autonomous vehicles 510a-510c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns.

Example Autonomous Vehicle Management System

Figure 6:
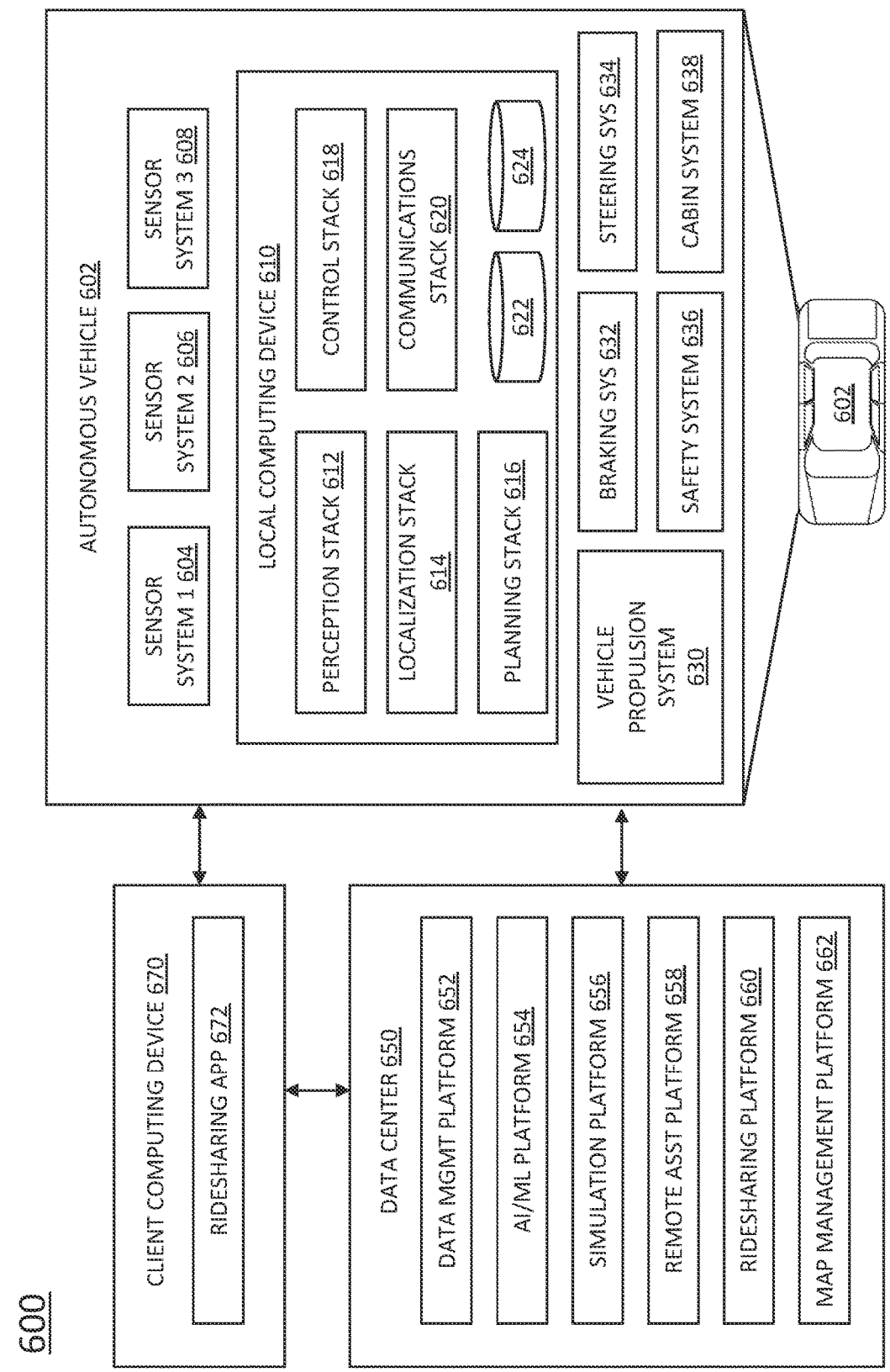
FIG. 6 illustrates an example system environment that can be used to facilitate autonomous vehicle (AV) dispatch and operations, according to some aspects of the disclosed technology.

Turning now to FIG. 6, this figure illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 650, and a client computing device 670. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.). In various examples, the AV management system 600 can be used to control an autonomous vehicle to pick up and/or drop off a user or delivery. The pick-up and drop-off locations of a user can be recorded and transmitted to a central computer, which can track locations the user has visited, as discussed herein.

AV 602 can navigate about roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

AV 602 can also include several mechanical systems that can be used to maneuver or operate AV 602. For instance, the mechanical systems can include vehicle propulsion system 630, braking system 632, steering system 634, safety system 636, and cabin system 638, among other systems. Vehicle propulsion system 630 can include an electric motor, an internal combustion engine, or both. The braking system 632 can include an engine brake, a wheel braking system (e.g., a disc braking system that utilizes brake pads), hydraulics, actuators, and/or any other suitable componentry configured to assist in decelerating AV 602. The steering system 634 can include suitable componentry configured to control the direction of movement of the AV 602 during navigation. Safety system 636 can include lights and signal indicators, a parking brake, airbags, and so forth. The cabin system 638 can include cabin temperature control systems, in-cabin entertainment systems, and so forth. In some embodiments, the AV 602 may not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a planning stack 616, a control stack 618, a communications stack 620, a High Definition (HD) geospatial database 622, and an AV operational database 624, among other stacks and systems.

Perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 622, other components of the AV, and other data sources (e.g., the data center 650, the client computing device 670, third-party data sources, etc.). The perception stack 612 can detect and classify objects and determine their current and predicted locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth. The perception stack 612 can be used in sentinel mode to sense the vehicle environment and identify objects.

Mapping and localization stack 614 can determine the AV's position and orientation (pose) using different methods from multiple systems (e.g., GPS, IMUs, cameras, LIDAR, RADAR, ultrasonic sensors, the HD geospatial database 622, etc.). For example, in some embodiments, the AV 602 can compare sensor data captured in real-time by the sensor systems 604-608 to data in the HD geospatial database 622 to determine its precise (e.g., accurate to the order of a few centimeters or less) position and orientation. The AV 602 can focus its search based on sensor data from one or more first sensor systems (e.g., GPS) by matching sensor data from one or more second sensor systems (e.g., LIDAR). If the mapping and localization information from one system is unavailable, the AV 602 can use mapping and localization information from a redundant system and/or from remote data sources.

The planning stack 616 can determine how to maneuver or operate the AV 602 safely and efficiently in its environment. For example, the planning stack 616 can receive the location, speed, and direction of the AV 602, geospatial data, data regarding objects sharing the road with the AV 602 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 602 from one point to another. The planning stack 616 can determine multiple sets of one or more mechanical operations that the AV 602 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 616 can select from multiple backup plans to carry out. For example, while preparing to change lanes to turn right at an intersection, another vehicle may aggressively cut into the destination lane, making the lane change unsafe. The planning stack 616 could have already determined an alternative plan for such an event, and upon its occurrence, help to direct the AV 602 to go around the block instead of blocking a current lane while waiting for an opening to change lanes.

The control stack 618 can manage the operation of the vehicle propulsion system 630, the braking system 632, the steering system 634, the safety system 636, and the cabin system 638. The control stack 618 can receive sensor signals from the sensor systems 604-608 as well as communicate with other stacks or components of the local computing device 610 or a remote system (e.g., the data center 650) to effectuate operation of the AV 602. For example, the control stack 618 can implement the final path or actions from the multiple paths or actions provided by the planning stack 616. This can involve turning the routes and decisions from the planning stack 616 into commands for the actuators that control the AV's steering, throttle, brake, and drive unit.

The communication stack 620 can transmit and receive signals between the various stacks and other components of the AV 602 and between the AV 602, the data center 650, the client computing device 670, and other remote systems. The communication stack 620 can enable the local computing device 610 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 620 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 622 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes. The maps and data stored in the HD geospatial database 622 can include HD maps and/or data related to a user's visit history, including data on various map sections the user has visited, sections the user has not yet visited, and sections the user has not yet visited and where proposed destinations are located, as described above with respect to FIGS. 3A-3C.

The AV operational database 624 can store raw AV data generated by the sensor systems 604-608 and other components of the AV 602 and/or data received by the AV 602 from remote systems (e.g., the data center 650, the client computing device 670, etc.). In some embodiments, the raw AV data can include HD LIDAR point cloud data, image or video data, RADAR data, GPS data, and other sensor data that the data center 650 can use for creating or updating AV geospatial data as discussed further below with respect to FIG. 5 and elsewhere in the present disclosure.

The data center 650 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 650 can include one or more computing devices remote to the local computing device 610 for managing a fleet of AVs and AV-related services. For example, in addition to managing the AV 602, the data center 650 may also support a ridesharing service, a delivery service, a remote/roadside assistance service, street services (e.g., street mapping, street patrol, street cleaning, street metering, parking reservation, etc.), and the like.

The data center 650 can send and receive various signals to and from the AV 602 and the client computing device 670. These signals can include sensor data captured by the sensor systems 604-608, roadside assistance requests, software updates, ridesharing pick-up and drop-off instructions, and so forth. In this example, the data center 650 includes one or more of a data management platform 652, an Artificial Intelligence/Machine Learning (AI/ML) platform 654, a simulation platform 656, a remote assistance platform 658, a ridesharing platform 660, and a map management platform 662, among other systems.

Data management platform 652 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

The AI/ML platform 654 can provide the infrastructure for training and evaluating machine learning algorithms for operating the AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

The simulation platform 656 can enable testing and validation of the algorithms, machine learning models, neural networks, and other development efforts for the AV 602, the remote assistance platform 658, the ridesharing platform 660, the map management platform 662, and other platforms and systems. The simulation platform 656 can replicate a variety of driving environments and/or reproduce real-world scenarios from data captured by the AV 602, including rendering geospatial information and road infrastructure (e.g., streets, lanes, crosswalks, traffic lights, stop signs, etc.) obtained from the map management platform 662; modeling the behavior of other vehicles, bicycles, pedestrians, and other dynamic elements; simulating inclement weather conditions, different traffic scenarios; and so on.

The remote assistance platform 658 can generate and transmit instructions regarding the operation of the AV 602. For example, in response to an output of the AI/ML platform 654 or other system of the data center 650, the remote assistance platform 658 can prepare instructions for one or more stacks or other components of the AV 602.

The ridesharing platform 660 can interact with a customer of a ridesharing service via a ridesharing application 672 executing on the client computing device 670. The client computing device 670 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 672. The client computing device 670 can be a customer's mobile computing device or a computing device integrated with the AV 602 (e.g., the local computing device 610). The ridesharing platform 660 can receive requests to be picked up or dropped off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of the data center 650. For example, the AI/ML platform 654 may incorporate the map viewing services for visualizing the effectiveness of various object detection or object classification models, the simulation platform 656 may incorporate the map viewing services for recreating and visualizing certain driving scenarios, the remote assistance platform 658 may incorporate the map viewing services for replaying traffic incidents to facilitate and coordinate aid, the ridesharing platform 660 may incorporate the map viewing services into the client application 672 to enable passengers to view the AV 602 in transit en route to a pick-up or drop-off location, and so on.

Figure 7:
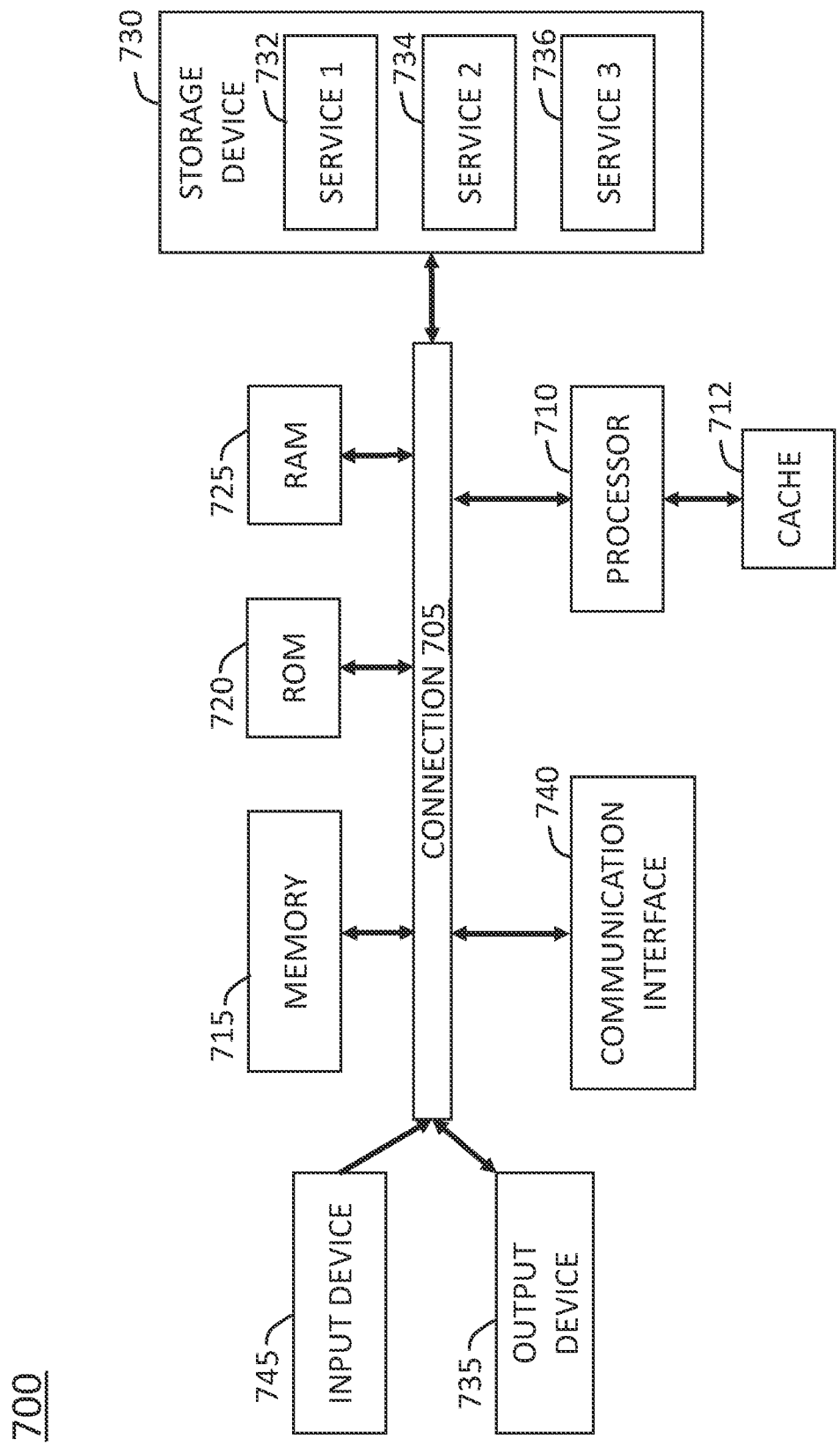
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric. In some examples, the processor 710 is an image processor that can process images from vehicle image sensors. In some examples, the processor 710 can determine a sensor field of view. In some examples, the processor 710 can stitch together captured images from adjacent image sensors.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a method for autonomous vehicle user maps comprising: retrieving a map of a selected region based on a user location of a first user; dividing the map into a plurality of map sections; identifying a first subset of the plurality of map sections the first user has visited, based in part on user ride history; identifying a second subset of the plurality of map sections the user has not visited, based in part on user ride history; shading the first subset of the map sections with a first shade; shading the second subset of map sections with a second shade; determining, based on user ride history of the first user and based on destinations of a plurality of fleet vehicles in the selected region over a selected period of time, a set of recommended destinations in the selected region; identifying, in the set of recommended destinations, a set of proposed destinations located in the second subset of map sections; identifying a third subset of the plurality of map sections including the set of proposed destinations; highlighting the third subset of map sections with a third shade; and displaying the set of proposed destinations on the map.

Example 2 provides a method, system, and/or vehicle according to any of the preceding and/or following examples, further comprising providing a selectable link for each proposed destination of the set of proposed destinations, wherein each proposed destination is displayed on a touchscreen with the selectable link.

Example 3 provides a method, system, and/or vehicle according to any of the preceding and/or following examples, further comprising displaying a list of the set of proposed destinations.

Example 4 provides a method, system, and/or vehicle according to any of the preceding and/or following examples, further comprising displaying a type of destination for each of the set of proposed destinations, wherein the type includes one of sightseeing, dining, shopping, and event.

Example 5 provides a method, system, and/or vehicle according to any of the preceding and/or following examples, further comprising wherein identifying the first and second subsets of the plurality of map sections is based, in part, on user location data.

Example 6 provides a method, system, and/or vehicle according to any of the preceding and/or following examples, further comprising wherein dividing the map includes dividing the map based on defined local districts, such that each map section corresponds with a selected one of the defined local districts.

Example 7 provides a method, system, and/or vehicle according to any of the preceding and/or following examples, wherein the selected region is a first region, and wherein determining the set of recommended destinations includes determining the set of recommended destinations based on user ride history of the first user, wherein the user ride history includes a list of ride destinations of the first user in a second region, and wherein the second region is different from the first user's default region.

Example 8 provides a method, system, and/or vehicle according to any of the preceding and/or following examples, further comprising: receiving, from the ridehail application, a ride request from the user location to a selected destination of the set of proposed destinations; and selecting an autonomous vehicle to fulfill the ride request, wherein the autonomous vehicle includes an onboard computer configured to autonomously control the first autonomous vehicle to drive from the user location to the selected destination.

Example 9 provides a method, system, and/or vehicle according to any of the preceding and/or following examples, further comprising shading the first subset of the map sections with a first shade, and wherein the first, second, and third shades can have any selected transparency setting, and further comprising presenting, via the ridehail application, an option to adjust the selected transparency setting for each of the first, second, and third shades.

Example 10 provides a system for autonomous vehicle user maps, comprising: a central computer in communication with each of a plurality of fleet vehicles, the central computer configured to: retrieve a map of a selected region based on a user location of a first user; divide the map into a plurality of map sections; identify a first subset of the plurality of map sections, based in part on user ride history, wherein the first subset includes map sections the first user has visited; identify a second subset of the plurality of map sections, based in part on user ride history, wherein the second subset includes map sections the user has not visited; determine, based on destinations of a plurality ride requests from visitors to the selected region over a selected period of time, a set of recommended destinations in the selected region; identify, in the set of recommended destinations, a set of proposed destinations located in the second subset of map sections; identify a third subset of the plurality of map sections including the set of proposed destinations; a ridehail application including a user interface displaying the map of the selected region, configured to: shade the first subset of the map sections with a first shade; shade the second subset of map sections with a second shade; and shade the third subset of map sections with a third shade.

Example 11 provides a method, system, and/or vehicle according to any of the preceding and/or following examples, wherein the ridehail application is further configured to provide a selectable link for each proposed destination of the set of proposed destinations.

Example 12 provides a method, system, and/or vehicle according to any of the preceding and/or following examples, wherein the ridehail application is further configured to display a list of the set of proposed destinations, wherein the list includes a destination name for each proposed destination and a destination location for each proposed destination, and wherein the ridehail application is configured to display each of the set of proposed destinations on the map.

Example 13 provides a method, system, and/or vehicle according to any of the preceding and/or following examples, wherein the central computer is further configured to identify the first and second subsets of the plurality of map sections is based, in part, on user location data for locations in the selected region.

Example 14 provides a method, system, and/or vehicle according to any of the preceding and/or following examples, wherein the ridehail application is further configured to display a type of destination for each of the set of proposed destinations, wherein the type includes one of sightseeing, dining, shopping, event, and outdoor.

Example 15 provides a method, system, and/or vehicle according to any of the preceding and/or following examples, wherein the central computer is further configured to divide the map into the plurality of map sections based on defined local districts, such that each map section corresponds with a selected one of the defined local districts.

Example 16 provides a method, system, and/or vehicle according to any of the preceding and/or following examples, wherein the selected region is a first region, and wherein the central computer is further configured to determine the set of recommended destinations based on user ride history of the first user, wherein the user ride history includes a list of ride destinations of the first user in a second region, and wherein the second region is different from the first user's default region.

Example 17 provides a method, system, and/or vehicle according to any of the preceding and/or following examples, wherein the central computer is further configured to: receive, from the ridehail application, a ride request from the user location to a selected destination of the set of proposed destinations; and select an autonomous vehicle to fulfill the ride request, wherein the autonomous vehicle includes an onboard computer configured to autonomously control the first autonomous vehicle to drive from the user location to the selected destination.

Example 18 provides a method, system, and/or vehicle according to any of the preceding and/or following examples, wherein the first, second, and third shades can have any selected transparency setting, and wherein the ridehail application is further configured to present an option to adjust the selected transparency setting for each of the first, second, and third shades.

Example 19 provides a system for autonomous vehicle user maps, comprising: an online portal configured to receive a ride request from a user including a request for a set of proposed destinations in a selected region, wherein the selected region is different from a default region of the user;

and a central computer configured to: retrieve a map of the selected region; divide the map into a plurality of map sections; identify a first subset of the plurality of map sections, based in part on user ride history, wherein the first subset includes map sections the first user has visited; identify a second subset of the plurality of map sections, based in part on user ride history, wherein the second subset includes map sections the user has not visited; determine a set of recommended destinations in the selected region, based on user ride history of the user, wherein the user ride history includes a list of ride destinations of the user in a second region, and wherein the second region is different from the default region of the user; identify, in the set of recommended destinations, a set of proposed destinations located in the second subset of map sections; identify a third subset of the plurality of map sections including the set of proposed destinations; wherein the online portal is configured to display the map of the selected region, including the plurality of map sections, and wherein the online portal is configured to: shade the first subset of the map sections with a first shade; shade the second subset of map sections with a second shade; and shade the third subset of map sections with a third shade Example 20 provides a method, system, and/or vehicle according to any of the preceding and/or following examples, wherein the online portal is further configured to display a list of the set of proposed destinations, wherein the list includes a destination name for each proposed destination and a destination location for each proposed destination, and wherein the online portal is configured to display each of the set of proposed destinations on the map.

Example 21 provides a method for autonomous vehicle user maps comprising: retrieving a pre-stored map of a selected region based on a user location of a first user, wherein the pre-stored map is associated with a user account of the first user, and wherein the pre-stored map includes a first subset of a plurality of map sections the first user has visited, and a second subset of the plurality of map sections the user has not visited, wherein the first subset is shaded a first shade and the second subset is shaded a second shade; controlling, via an onboard computer, an autonomous vehicle to drive along a selected route, wherein the route include a first portion of the second subset of map sections the user has not visited; and updating the pre-stored map to change the first portion of map sections to be in the first subset of map sections.

Example 22 provides a method, system, and/or vehicle according to any of the preceding and/or following examples, further comprising using autonomous vehicle sensors to determine an autonomous vehicle location and using the autonomous vehicle location to determine a user location, and identifying the first portion of map sections based on the user location.

Example 23 provides a method, system, and/or vehicle according to any of the preceding and/or following examples, further comprising determining, based on user ride history of the first user and based on destinations of a plurality of fleet vehicles in the selected region over a selected period of time, a set of recommended destinations in the selected region; identifying, in the set of recommended destinations, a set of proposed destinations located in the second subset of map sections; identifying a third subset of the plurality of map sections including the set of proposed destinations; highlighting the third subset of map sections with a third shade; and displaying the set of proposed destinations on the map pre-stored maps Example 24 includes a vehicle comprising means for performing the method of any of the examples 1-20.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method for vehicle user maps comprising:
retrieving a map of a selected region based on a user location of a user, wherein the selected region is different from a default region of the user;
dividing the map into a plurality of map sections;
identifying a first subset of the plurality of map sections, based in part on user ride history, wherein the first subset includes map sections the user has visited;
identifying a second subset of the plurality of map sections, based in part on the user ride history, wherein the second subset includes map sections the user has not visited;
shading the second subset of map sections with a second shade;
determining, based on destinations of a plurality of ride requests from visitors to the selected region over a selected period of time, a set of recommended destinations in the selected region;
identifying, in the set of recommended destinations, a set of proposed destinations located in the second subset of map sections;
identifying a third subset of the plurality of map sections including the set of proposed destinations;
highlighting the third subset of map sections with a third shade;
displaying the set of proposed destinations on the map in a ridehail application for the user; and
shading the first subset of the map sections with a first shade, and wherein the first, second, and third shades can have any selected transparency setting, and further comprising presenting, via the ridehail application, an option to adjust the selected transparency setting for each of the first, second, and third shades.

2. The method of claim 1, further comprising providing a selectable link for each proposed destination of the set of proposed destinations, wherein each proposed destination is displayed on a touchscreen with the selectable link.

3. The method of claim 2, further comprising displaying a list of the set of proposed destinations, wherein the list includes a destination name for each proposed destination and a destination location for each proposed destination.

4. The method of claim 3, further comprising displaying a type of destination for each of the set of proposed destinations, wherein the type includes one of sightseeing, dining, shopping, event, and outdoor.

5. The method of claim 4, wherein identifying the first and second subsets of the plurality of map sections is based, in part, on user location data.

6. The method of claim 1, wherein dividing the map includes dividing the map based on defined local districts, such that each map section corresponds with a selected one of the defined local districts.

7. The method of claim 1, wherein the selected region is a first region, and wherein determining the set of recommended destinations includes determining the set of recommended destinations based on user ride history of the user, wherein the user ride history includes a list of ride destinations of the user in a second region, and wherein the second region is different from the default region of the user.

8. The method of claim 1, further comprising:
receiving, from the ridehail application, a ride request from the user location to a selected destination of the set of proposed destinations; and
selecting an autonomous vehicle to fulfill the ride request, wherein the autonomous vehicle includes an onboard computer configured to autonomously control the first autonomous vehicle to drive from the user location to the selected destination.

9. A system for vehicle user maps, comprising:
a central computer in communication with each of a plurality of fleet vehicles, the central computer configured to:
retrieve a map of a selected region based on a user location of a user;
divide the map into a plurality of map sections;
identify a first subset of the plurality of map sections, based in part on user ride history, wherein the first subset includes map sections the first-user has visited;
identify a second subset of the plurality of map sections, based in part on the user ride history, wherein the second subset includes map sections the user has not visited;
determine, based on destinations of a plurality of ride requests from visitors to the selected region over a selected period of time, a set of recommended destinations in the selected region;
identify, in the set of recommended destinations, a set of proposed destinations located in the second subset of map sections; and
identify a third subset of the plurality of map sections including the set of proposed destinations; and
a ridehail application including a user interface displaying the map of the selected region, configured to:
shade the first subset of the map sections with a first shade;
shade the second subset of map sections with a second shade; and
shade the third subset of map sections with a third shade,
wherein the first, second, and third shades can have any selected transparency setting, and wherein the ridehail application is further configured to present an option to adjust the selected transparency setting for each of the first, second, and third shades.

10. The system of claim 9, wherein the ridehail application is further configured to provide a selectable link for each proposed destination of the set of proposed destinations.

11. The system of claim 10, wherein the ridehail application is further configured to display a list of the set of proposed destinations, wherein the list includes a destination name for each proposed destination and a destination location for each proposed destination, and wherein the ridehail application is configured to display each of the set of proposed destinations on the map.

12. The system of claim 11, wherein the central computer is further configured to identify the first and second subsets of the plurality of map sections based, in part, on user location data for locations in the selected region.

13. The system of claim 11, wherein the ridehail application is further configured to display a type of destination for each of the set of proposed destinations, wherein the type includes one of sightseeing, dining, shopping, event, and outdoor.

14. The system of claim 9, wherein the central computer is further configured to divide the map into the plurality of map sections based on defined local districts, such that each map section corresponds with a selected one of the defined local districts.

15. The system of claim 9, wherein the selected region is a first region, and wherein the central computer is further configured to determine the set of recommended destinations based on user ride history of the first user, wherein the user ride history includes a list of ride destinations of the first-user in a second region, and wherein the second region is different from a first user's default region of the user.

16. The system of claim 9, wherein the central computer is further configured to:
receive, from the ridehail application, a ride request from the user location to a selected destination of the set of proposed destinations; and
select an autonomous vehicle to fulfill the ride request, wherein the autonomous vehicle includes an onboard computer configured to autonomously control the first-autonomous vehicle to drive from the user location to the selected destination.

17. A system for vehicle user maps, comprising:
an online portal configured to receive a ride request from a user including a request for a set of proposed destinations in a selected region, wherein the selected region is different from a default region of the user; and
a central computer configured to:
retrieve a map of the selected region;
divide the map into a plurality of map sections;
identify a first subset of the plurality of map sections, based in part on user ride history, wherein the first subset includes map sections the first-user has visited;
identify a second subset of the plurality of map sections, based in part on the user ride history, wherein the second subset includes map sections the user has not visited;
determine a set of recommended destinations in the selected region, based on user ride history of the user, wherein the user ride history includes a list of ride destinations of the user in a second region, and wherein the second region is different from the default region of the user;
identify, in the set of recommended destinations, a set of proposed destinations located in the second subset of map sections;
identify a third subset of the plurality of map sections including the set of proposed destinations;
wherein the online portal is configured to display the map of the selected region, including the plurality of map sections, and wherein the online portal is configured to:
shade the first subset of the map sections with a first shade;
shade the second subset of map sections with a second shade; and
shade the third subset of map sections with a third shade,
wherein the first, second, and third shades can have any selected transparency setting, and wherein the online portal is further configured to present an option to adjust the selected transparency setting for each of the first, second, and third shades.

18. The system of claim 17, wherein the online portal is further configured to display a list of the set of proposed destinations, wherein the list includes a destination name for each proposed destination and a destination location for each proposed destination, and wherein the online portal is configured to display each of the set of proposed destinations on the map.

\* \* \* \* \*